(12) United States Patent
Berteau et al.

(10) Patent No.: US 10,050,791 B2
(45) Date of Patent: Aug. 14, 2018

(54) METHOD FOR VERIFYING THE IDENTITY OF A USER OF A COMMUNICATING TERMINAL AND ASSOCIATED SYSTEM

(71) Applicant: MORPHO, Issy-les-Moulineaux (FR)

(72) Inventors: Guillaume Berteau, Paris (FR); Bruno Benteo, Paris (FR)

(73) Assignee: Morpho, Issy les Moulineaux (FR)

( * ) Notice: Subject to any disclaimer, the term of this patent is extended or adjusted under 35 U.S.C. 154(b) by 26 days.

(21) Appl. No.: 14/380,535

(22) PCT Filed: Jan. 31, 2013

(86) PCT No.: PCT/FR2013/050197
§ 371 (c)(1),
(2) Date: Aug. 22, 2014

(87) PCT Pub. No.: WO2013/128091
PCT Pub. Date: Sep. 6, 2013

(65) Prior Publication Data
US 2015/0038118 A1    Feb. 5, 2015

(30) Foreign Application Priority Data
Feb. 27, 2012 (FR) ...................................... 12 51753

(51) Int. Cl.
*G06F 21/32* (2013.01)
*H04L 9/32* (2006.01)
(Continued)

(52) U.S. Cl.
CPC ............ *H04L 9/3231* (2013.01); *G06F 21/32* (2013.01); *G06F 21/34* (2013.01); *G06F 21/35* (2013.01);
(Continued)

(58) Field of Classification Search
CPC .......... G06F 21/32; G06F 21/34; G06F 21/35; G06F 21/6227; H04L 63/0861; H04L 9/3231; H04L 9/3234; H04W 12/06
See application file for complete search history.

(56) References Cited

U.S. PATENT DOCUMENTS 8,516,269 B1 * 8/2013 Hamlet et al. ................ 713/189
8,571,537 B2   10/2013 Kaliner
(Continued)

FOREIGN PATENT DOCUMENTS

EP   2 323 308 A1   5/2011
JP      4109164 B   7/2008
(Continued)

OTHER PUBLICATIONS

International Search Report dated Apr. 2, 2013 in PCT/FR2013/050197 filed Jan. 31, 2013.
(Continued)

*Primary Examiner* — Theodore C Parsons
(74) *Attorney, Agent, or Firm* — Christensen O'Connor Johnson Kindness PLLC

(57) ABSTRACT

A method for verifying identity of a user of a communicating terminal, including: a preliminary operation including: communicating a first piece of identity data of a user to at least one server, generating a second piece of identity data of the user from the server, the second piece of data defining a derived identity of the user, and storing the second piece of identity data in a secure memory of the terminal; an operation for identity verification, including: transmitting a token for encryption from the server to the terminal, using the second piece of data at the terminal at least to generate an encryption of the token, the encrypted token being transmitted to the server and verified by the server, and in a case of positive verification of the encrypted token by the server, (Continued)

Figure 1:
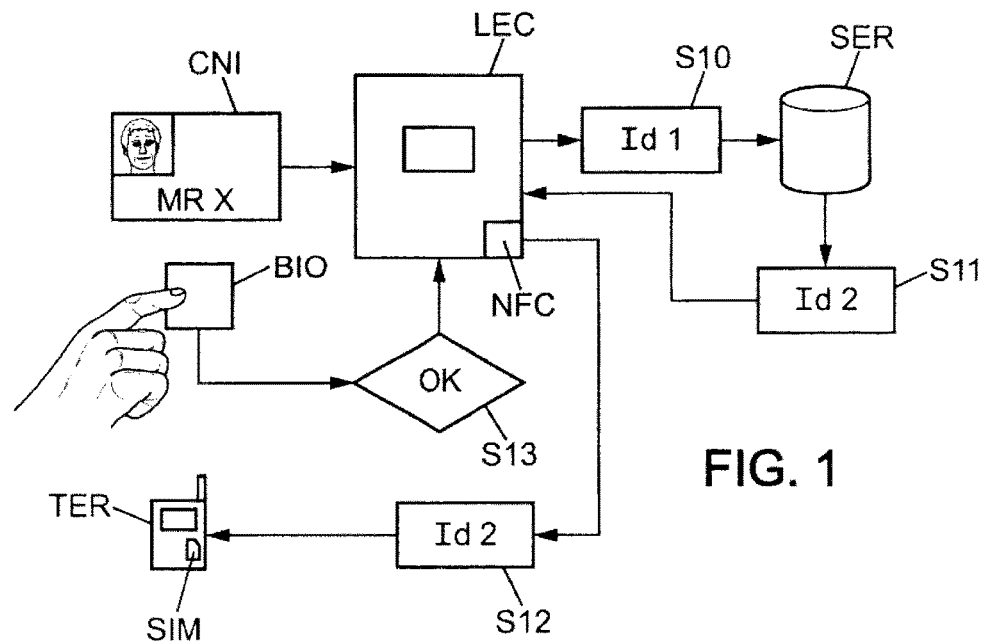

the server validates the identity verification of the user of the terminal.

13 Claims, 1 Drawing Sheet

(51) Int. Cl.
| | | |
|---|---|---|
| *G06F 21/35* | (2013.01) | |
| *G06F 21/34* | (2013.01) | |
| *H04W 12/06* | (2009.01) | |
| *H04W 4/80* | (2018.01) | |
| *H04W 4/00* | (2018.01) | |
| *H04L 29/06* | (2006.01) | |

(52) U.S. Cl.
CPC .......... *H04L 9/3234* (2013.01); *H04L 9/3271* (2013.01); *H04L 63/0861* (2013.01); *H04W 12/06* (2013.01); *H04L 63/0823* (2013.01); *H04L 2463/082* (2013.01); *H04W 4/008* (2013.01); *H04W 4/80* (2018.02)

(56) References Cited

U.S. PATENT DOCUMENTS

| 8,667,265 | B1* | 3/2014 | Hamlet et al. ................. 713/150 |
| 2005/0156029 | A1* | 7/2005 | Hopkins ................. G06F 21/34 235/382 |
| 2005/0240779 | A1* | 10/2005 | Aull et al. .................... 713/186 |
| 2007/0118891 | A1* | 5/2007 | Buer ................................ 726/8 |
| 2007/0266234 | A1* | 11/2007 | Inami .................... H04L 63/123 713/153 |
| 2009/0010503 | A1* | 1/2009 | Mathiassen et al. ......... 382/125 |
| 2009/0076891 | A1* | 3/2009 | Cardone ................ G07C 13/00 705/12 |
| 2009/0259838 | A1* | 10/2009 | Lin ....................... H04L 9/3271 713/150 |
| 2009/0320118 | A1* | 12/2009 | Muller et al. ..................... 726/9 |
| 2010/0242102 | A1* | 9/2010 | Cross ..................... G06F 21/32 726/7 |
| 2011/0002461 | A1* | 1/2011 | Erhart et al. .................... 380/44 |
| 2011/0283107 | A1* | 11/2011 | Villegas ................ H04L 9/0838 713/168 |
| 2012/0058818 | A1* | 3/2012 | Kelly .................. G07F 17/3239 463/25 |
| 2012/0066497 | A1* | 3/2012 | Kumar et al. ................. 713/168 |
| 2012/0089520 | A1* | 4/2012 | Mardikar ........................ 705/71 |
| 2012/0185397 | A1* | 7/2012 | Levovitz ................ G06Q 20/32 705/71 |
| 2012/0284193 | A1* | 11/2012 | Bharghavan .......... H04L 9/3263 705/64 |
| 2012/0303966 | A1* | 11/2012 | Hubner ........................ 713/186 |
| 2013/0010957 | A1* | 1/2013 | Yu et al. ....................... 380/260 |
| 2013/0263238 | A1* | 10/2013 | Bidare ............... G07C 9/00087 726/7 |
| 2014/0237256 | A1* | 8/2014 | Ben Ayed ..................... 713/186 |

FOREIGN PATENT DOCUMENTS

| JP | 2010177998 A | 8/2010 |
| WO | 2009141035 A1 | 11/2009 |

OTHER PUBLICATIONS

French Preliminary Search Report dated Oct. 17, 2012 in Patent Application No. FR 1251753 filed Feb. 27, 2012 (with English translation of Categories of Cited Documents).

A. Menezes, et al. "Chapter 10: Identification and Entity Authentication" Handbook of Applied Cryptography, XP001525010, Oct. 1, 1996, pp. 385-424, and Cover Page http://www.cacr.math.uwaterloo.ca/hac.

Sandra Dominikus, et al., "mCoupons: An Application for Near Field Communication (NFC)" Advanced Information Networking and Applications Workshop, XP031334719, May 21, 2007, pp. 421-428.

Mihir Bellare, et al., "Security Proofs for Identity-Based Identification and Signature Schemes" Journal of Cryptology, vol. 22, No. 1, XP019699801, Aug. 22, 2008, pp. 1-61.

U.S. Appl. No. 14/382,920, filed Sep. 4, 2014, Benteo, et al.

Shibata, Y., et al., "Mechanism-Based PKI," Information Processing Society of Japan, Computer Security Symposium, vol. 2003, No. 15, Oct. 29, 2003, 7 pages.

\* cited by examiner

METHOD FOR VERIFYING THE IDENTITY OF A USER OF A COMMUNICATING TERMINAL AND ASSOCIATED SYSTEM

The present invention relates to determining access and/or subscription to a service by verifying the identity of a user, from a communicating terminal (in particular a mobile terminal) of the user.

The concept of "identity" is becoming pervasive and routine in the mobile environment. However, a digital identity must be protected from all forms of theft while remaining ergonomic for the owner to use.

Known solutions (OTP (One Time Password), SSO (Single Sign On), SMS (Short Message Service), solutions using OpenID standards, or others), all based on login/password types of processes or network identifiers (such as a phone number) associated with management of user attributes, are not entirely satisfactory.

The invention proposes a solution. In particular, the invention proposes a method for verifying the identity of a user of a communicating terminal, comprising:
  a preliminary step comprising:
    communicating a first piece of identity data of the user to at least one server,
    generating at the server a second piece of identity data of the user, the second piece of data defining a derived identity of the user, and
    storing the second piece of identity data in a secure memory of the terminal,
  a current step for identity verification, comprising:
    transmitting a token for encryption, from the server to the terminal,
    using the second piece of data at the terminal at least to generate an encryption of the token, the encrypted token being transmitted to the server and verified by the server, and
    in case of positive verification of the encrypted token by the server, the server validates the identity verification of the user of the terminal.

A communicating terminal (telephone, tablet, smartphone) thus becomes, if associated with a derived identity resulting from an authenticated identity, a connected medium facilitating the validation of rights (particularly by strong authentication) and the sharing of security data with local or remote parties of a transaction.

Depending on the embodiments, the method of the invention may have one or more of the following features:
  the encryption uses a public key infrastructure, the derived identity data at least being used for generating an encryption key;
  the derived identity data is a digital certificate certifying the encryption by the terminal;
  in case of positive verification, the encrypted token is associated with a digital identification certificate for the user;
  the communication of the first piece of identity data of the user to the server is authorized after verification of biometric data of the user of the terminal;
  the current step includes verification of user-specific data before initiating, on the terminal, the use of the second piece of data for encryption of the token;
  a plurality of preliminary steps are provided, with a plurality of communications of the first piece of identity data of the user to a plurality of servers, each server generating the respective second pieces of identity data of the user, each second piece of data defining a derived identity of the user, each derived identity being specific to a service for which access is dependent on encrypted token verification on a server dedicated to said service;
  the communication of the first piece of identity data to the server is carried out via a reader comprising a module for short-range or wired communication, and, as the terminal comprises a corresponding module for short-range or wired communication, the second piece of data is transmitted from the server to the reader, then from the reader to the terminal by short-range or wired communication;
  transmission of the token for encryption and/or the encrypted token, between the server and the terminal, is performed via a device requesting access to a service associated with the server, access to the service being dependent on verification of the identity of the user from the user terminal in said current step;
  transmission of the token for encryption and/or the encrypted token, between the terminal and the device, is performed by short-range or wired communication, the terminal comprising a module for short-range or wired communication and the device comprising a corresponding module for short-range or wired communication;
  transmission of the token for encryption, from the server to the terminal, is performed using a mobile network, and transmission of the encrypted token from the terminal to the server is performed via a device requesting access to a service associated with the server, access to the service being dependent on verification of the identity of the user from the user terminal in said current step;
  transmission of the token for encryption, from the server to the terminal, is performed via a device requesting access to a service associated with the server, and transmission of the encrypted token from the terminal to the server is performed using a mobile network, access to the service being dependent on verification of the identity of the user from the user terminal in said current step.

The invention also relates to a system for verifying the identity of a user, comprising at least a terminal and a server for implementing the method according to the invention.

Figure 2:
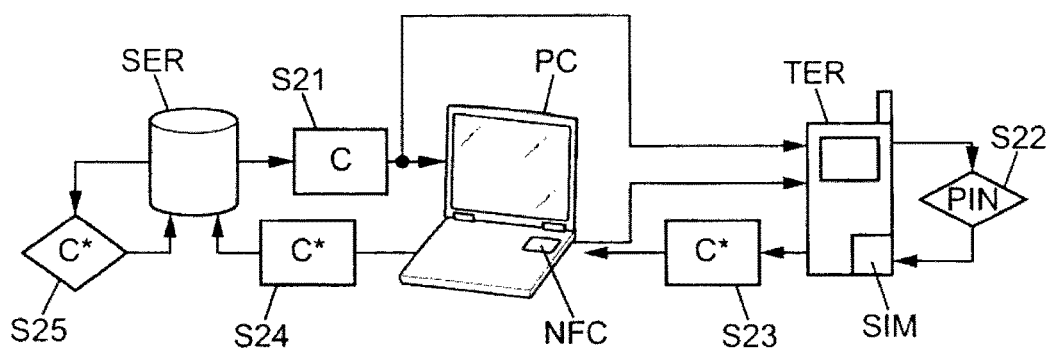

Other features and advantages of the invention will become apparent from the following detailed description presenting some possible exemplary embodiments, and upon examining the accompanying drawings in which:

FIG. 1 illustrates the main operations carried out by a system according to the invention, during the preliminary terminal declaration step; and FIG. 2 shows the main operations carried out by a system according to the invention, during a current identity verification step, based on the terminal.

Referring to FIG. 1, a user presents a physical medium such as, for example, a national identity card CNI, loyalty card, student card, or some other card, to be read by a reader LEC. To verify that this medium CNI is being presented by its true owner ("MR X"), the user presents biometric data, such as a fingerprint, in a reader BIO connected to the reader LEC for the card CNI. In one possible embodiment, the reader reads data (for example by scanning) from the card CNI and communicates the data, with the biometric data, for example to a remote server. This remote server verifies that the data from the card CNI and the biometric data coincide (validation test S13), and if so, the process can continue. In another possible embodiment, the biometric data can be used to protect certain data carried on the physical medium; the biometric data are transmitted to the medium which performs a local verification (for example using Match On Card) and then authorizes the use of the protected data.

After this first operation, the reader can communicate a first piece of identity data of the user Id1 to a remote server SER, in step S10. This identity Id1 may, for example, be a governmental identity of the individual, or a bank identity (in cases where the card CNI is a credit card), or some other identity. The first piece of identity data Id1 may also be a digital certificate sent to the remote server SER, which verifies the validity of the certificate (certificate chain, revocation status, expiration date, etc).

In one embodiment, the remote server SER determines, based on the first piece of identity data Id1, a derived identity Id2 in step S11 (for example by applying a hash function to the data Id1), and communicates a second piece of data concerning this derived identity Id2 to the reader LEC in the example represented. In one embodiment, the reader LEC may comprise means for short-range communication (for example an NFC module (Near Field Communication), or communication by Wifi, or Bluetooth, or wired (by USB cable for example)), to transmit the second piece of data concerning the derived identity Id2 to a communicating terminal TER chosen by the user, in step S12, the terminal TER of course also being equipped with a module for short-range communication. Alternatively, the derived identity Id2 can be transmitted directly from the server SER to the terminal TER by a mobile network.

In another embodiment, the derived identity Id2 may be a digital certificate. A secure element of the communicating terminal TER locally generates a key pair (i.e. a paired public key—private key), the private key being secret and not extractable from the secure element of the terminal. The public key is then communicated to the remote server SER with a request for certification of the key pair. The remote server SER generates a certificate linked to the authenticated identity, i.e. linked to the first piece of identity data of the user Id1. This certificate is then returned to the communicating terminal TER along with the key pair.

More specifically, the user terminal TER stores the derived identity Id2 in secure memory (for example in the SIM (Subscriber Identity Module) card, or more generally in a UICC (Universal Integrated Circuit Card) module, or in any security element of the terminal). For this purpose, an application can be transmitted from the server and via the reader LEC to the terminal, for example a "cardlet" which is installed on the terminal TER to store the derived identity Id2, for example using a method such as OTA (Over The Air).

According to one embodiment, the terminal TER may generate a key or a key pair from the data of the derived identity Id2, allowing symmetric encryption (or asymmetric for asymmetric cryptography) to occur later during the verification of the user identity, from the user terminal TER, as discussed below with reference to FIG. 2.

According to another embodiment, when the derived identity Id2 is a digital certificate as described above, the key pair associated with the certificate for the authenticated identity will be used for the encryption occurring later during the verification of the user identity, from the user terminal TER, as described with reference to FIG. 2.

In an exemplary embodiment, shown in FIG. 2, a device, for example a computer PC, an automated service terminal, or some other device, communicates with a service platform via a network such as the Internet. Before providing a secure service, the server SER associated with this service must verify the identity of the user. Therefore use is made of the aforementioned step of verifying the identity of the user from his terminal TER. For this purpose, with reference to FIG. 2, in step S21 the server SER sends a token C (i.e. a "challenge", which may for example correspond to a random number or a hash of a document), for example to the device PC. Using Near Field Communication NFC (the device PC being equipped with an NFC module), the token is sent to the terminal TER, which makes use of the data stored in secure memory (for example on its SIM card) and its cryptographic resources to sign this token in step S23. Advantageously, a systematic procedure can be implemented on the terminal TER, which consists of verifying user-specific data when the encryption key(s) stored in the terminal is/are to be used to generate a signature. For example, a man-machine interface can request the user to enter a personal code in step S22, or provide predetermined biometric data (fingerprint, iris, or other). In this manner, in case of fraudulent acquisition of the terminal TER by a malicious third party, no signature can be generated in step S23, and of course no service can subsequently be provided to the computer PC or to the service terminal.

The signed token C* is returned in step S24 to the server SER, for example via the computer PC by near field communication, in particular via the NFC module. In step S25, the server SER verifies this signature using its own key(s) and, of course, using the token C it initiated. The validity of the signature can include a standard verification of the validity of the certificate (certificate chain, revocation status, expiration date, etc.). Moreover, knowing the token sent in step S21, the "response" (i.e. the token signed by the private key of the terminal TER) returned in step S24, and the public key present in the certificate, a validation server is able to verify the validity of the signature.

It is thus understood that this signature corresponds to a digital certificate identifying the user with respect to said service.

The step of verifying the identity of the user, described with reference to FIG. 2, may be dual-channel, meaning for example that the token C to be signed (challenge or hash of a document) can be sent by the mobile network from the server SER directly to the communicating terminal TER, signed by the communicating terminal, then the signed token C* is returned to the server via an NFC interface of the device (computer PC or automated service terminal). It is understood that the dual-channel communication may also include communication of the token C to be signed, from the server SER to the communicating terminal TER, via an NFC interface of the device (computer PC or automated service terminal), and a direct return communication of the signed token C* from the terminal TER to the server SER via the mobile network.

In one particular embodiment, said derived identity Id2 is calculated for example from a hash function applied to the first piece of identity data Id1 issuing from reading the card CNI. Next, at least one key (or one pair of public and private keys), stored in the secure memory of the terminal TER, can be calculated from this derived identity Id2 (for example the private key in the case of asymmetric encryption). Moreover, once the user's identity is verified by the terminal, a session can be established for a secure service. For example, a diversified key can then be used for exchanges between the device PC and a service platform connected to the server SER.

Of course, the present invention is not limited to the embodiment described above by way of example. It extends to other variants.

For example, interaction with a reader by using near field communication was described above. As a variant, communication can be established directly between the terminal TER and the server SER, for example via a cellular network, for both the preliminary terminal declaration step and for the subsequent identity verification step.

Furthermore, the use of a device PC was described above with reference to FIG. 2 (or a reader LEC as a communicating terminal). In a simpler variant, the terminal TER can be used directly for accessing the service (or for the initial enrollment of the terminal) and the verification of the signature for the challenge (or enrollment) is done by direct communication between the server and the terminal without any intermediate device. However, the use of a communicating device (a reader terminal LEC, a computer PC, a tablet, or a television) advantageously provides an interface that improves the ergonomics of its use.

In addition, an interaction with an application server SER was described above. Alternatively, an interaction with a device based on CMS (Card Management System) or TSM (Trusted Service Management) may be provided in an equivalent manner.

Thus, the invention proposes using one (or more) embedded security component(s) in a communicating object, to embed a derived identity for which the evolution (theft, loss, repudiation, etc.) can already be managed by the original issuer of the medium CNI and which allows fast, easy, secure, and anonymous validation of the associated rights.

To this end, a calculation is performed, followed by transfer of the derived identity via the interfaces (often standardized) of the communicating objects, for example by local exchanges (using NFC (Near Field Communication)), or alternatively via the Internet (by WiFi or other connection), or possibly via the user interfaces of social networks (Facebook, LinkedIn, possibly even iTunes®), or by communication over a cellular network (3G, LTE or other). It is possible not to store the derived identity only in the secure memory. Storage may be provided in the communicating object of an application that handles the forwarding of external requests sent using the same interfaces as in the implementation of the preliminary terminal declaration step. Advantageously, a local authentication of the user data can be provided (for example by capturing biometric data), before the mobile terminal declaration. The invention then allows customization of cryptographic operations according to the online services or requests concerned, with creation of digital signatures specific to each service. The invention also avoids sharing important information with the parties involved in the transaction, during the service.

Advantageously, the validation of the pairing of the terminal, the authenticated identity, and the user can be based on two or three factors (data of the authenticated identity—what I have, a PIN code—what I know, biometric data—who I am). After validation of the authentication data using two or three factors of the authenticated bearer, an initial enrollment of the terminal can be performed using a government-issued identity card CNI, loyalty card, student card, or other. The introduction of biometrics/encryption into the generation of a digital signature is thus an optional but preferred embodiment. The invention then allows sharing non-meaningful data with verification by remote servers, without sharing the identity. It also allows the generation and communication of certificates and/or digital signatures, thus offering an option for later audits, and does so under conditions allowing customization after the issuing of signed applications with no need for specific environments.

Customization is thus ensured for highly sensitive applications, on the basis of initial identification of the bearer, due to the creation of a single link between the authenticated bearer and data calculated on the basis of information from the initial medium CNI which may be a security product (card or system with security processor). Then, the creation of conditions for generating diversified algorithms on the basis of data produced by the bearer (and not available in the objects) is also an advantage.

The invention claimed is:

1. A method for verifying identity of a user of a communicating terminal, the method comprising:
   performing a preliminary operation, and thereafter, performing a current operation,
   wherein the preliminary operation comprises:
      communicating, via a reader, a first piece of identity data of the user to at least one server;
      generating at the server a second piece of identity data of the user, the second piece of identity data being derived, at least in part, from the first piece of identity data;
      transmitting the second piece of data from the server to the reader, and then from the reader to the terminal; and
      storing the second piece of identity data in a secure memory of the terminal; and
   wherein the current operation for identity verification comprises:
      transmitting a token for encryption, from the server to the terminal without transiting through the reader;
      using the second piece of data at the terminal at least to generate an encryption of the token, the encrypted token being transmitted to the server and verified by the server without transiting through the reader; and
      in a case of positive verification of the encrypted token by the server, validating, by the server, the identity verification of the user of the terminal,
      and wherein said reader, said server and said terminal are distinct.

2. The method of claim 1, wherein the encryption uses a public key infrastructure, the second piece of identity data at least being used for generating an encryption key, and wherein the encryption key is used for encryption of the token.

3. The method of claim 1, wherein the second piece of identity data is a digital certificate certifying a key pair.

4. The method of claim 1, wherein, in the case of positive verification, the encrypted token is associated with a digital identification certificate for the user.

5. The method of claim 1, wherein the communication of the first piece of identity data of the user to the server is authorized after verification of biometric data of the user of the terminal.

6. The method of claim 1, wherein the current operation further comprises verification of user-specific data before initiating, on the terminal, the use of the second piece of data for encryption of the token.

7. The method of claim 1, wherein a plurality of preliminary operations are executed, with a plurality of communications of the first piece of identity data of the user to a plurality of servers, each server generating the respective second pieces of identity data of the user, each second piece of data defining a derived identity of the user, each derived identity being specific to a service for which access is dependent on encrypted token verification on a server dedicated to the service.

8. The method of claim 1, wherein the communication of the first piece of identity data to the server is carried out via the reader comprising a first module for short-range wireless or wired communication, and the terminal comprising a second module for short-range or wired communication, the second piece of data is transmitted from the server to the reader, then from the reader to the terminal by short-range wireless or wired communication, the short-range communication including near field communication (NFC), Wifi, or Bluetooth.

9. The method of claim 1, wherein the transmitting the token for encryption or the encrypted token, between the server and the terminal, is performed via a device requesting access to a service associated with the server, access to the service being dependent on verification of the identity of the user from the user terminal in the current operation.

10. The method of claim 9, wherein the transmitting the token for encryption or the encrypted token, between the terminal and the device, is performed by a short-range or wired communication, the terminal comprising a first module for short-range wireless or wired communication and the device comprising a second module for short-range wireless or wired communication, the short-range communication including near field communication (NFC), Wifi, or Bluetooth.

11. The method of claim 1, wherein the transmitting the token for encryption, from the server to the terminal, is performed using a mobile phone network, and the transmission of the encrypted token from the terminal to the server is performed via a device requesting access to a service associated with the server, access to the service being dependent on verification of the identity of the user from the user terminal in the current operation.

12. The method of claim 1, wherein the transmitting the token for encryption, from the server to the terminal, is performed via a device requesting access to a service associated with the server, and the transmission of the encrypted token from the terminal to the server is performed using a mobile network, access to the service being dependent on verification of the identity of the user from the user terminal in the current operation.

13. A system for verifying the identity of a user, the system comprising:
   a terminal;
   a reader; and
   a server,
   wherein the reader comprises a first communication module configured to communicate a first piece of identity data of the user to a second communication module of the server,
   wherein the server is configured to generate a second piece of identity data of the user, the second piece of identity data being derived, at least in part, from the first piece of identity data, and is configured to transmit the second piece of data to the reader,
   wherein the terminal comprises a third communication module configured to receive the second piece of data from the reader,
   wherein the terminal comprises a secure memory that stores the second piece of identity data, and
   wherein the second communication module is configured to transmit a token for encryption to the third communication module of the terminal without transiting through the reader, wherein the terminal is configured to use the second piece of data at least to generate an encryption of the token, wherein the third communication module is configured to transmit the encrypted token to the second communication module of the server without transiting through the reader, wherein the server is configured to verify the encrypted token and validate, in case of positive verification of the encrypted token, the identity verification of the user of the terminal;
   wherein said reader, said server and said terminal are distinct.

* * * * *